(12) United States Patent
Mizunuma et al.

(10) Patent No.: US 7,191,173 B2
(45) Date of Patent: Mar. 13, 2007

(54) METHOD OF DETERMINING DATABASE SEARCH PATH

(75) Inventors: Tadashi Mizunuma, Tokyo (JP); Shigeru Tago, Tokyo (JP); Junji Yoshii, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 403 days.

(21) Appl. No.: 10/805,376

(22) Filed: Mar. 22, 2004

(65) Prior Publication Data

US 2004/0193590 A1 Sep. 30, 2004

(30) Foreign Application Priority Data

Mar. 31, 2003 (JP) ............................. 2003-093554

(51) Int. Cl.
  G06F 7/00 (2006.01)
  G06F 17/30 (2006.01)
(52) U.S. Cl. ............................................. 707/3; 707/6
(58) Field of Classification Search ................ 707/3–6, 707/100
  See application file for complete search history.

(56) References Cited

U.S. PATENT DOCUMENTS

| | | | | |
|---|---|---|---|---|
| 4,507,752 | A | * | 3/1985 | McKenna et al. .......... 707/101 |
| 5,515,488 | A | | 5/1996 | Hoppe et al. |
| 5,790,121 | A | | 8/1998 | Sklar et al. |
| 5,812,134 | A | * | 9/1998 | Pooser et al. ................ 715/848 |
| 5,987,460 | A | * | 11/1999 | Niwa et al. ...................... 707/6 |
| 6,326,962 | B1 | | 12/2001 | Szabo |
| 6,327,586 | B1 | * | 12/2001 | Kisiel ............................ 707/2 |
| 2002/0099685 | A1 | | 7/2002 | Takano et al. |
| 2003/0195888 | A1 | * | 10/2003 | Croft et al. .................... 707/10 |
| 2004/0049510 | A1 | * | 3/2004 | Minch et al. ................ 707/100 |

FOREIGN PATENT DOCUMENTS

| | | |
|---|---|---|
| EP | 1 182 581 A1 | 8/2000 |
| EP | 1 229 456 A2 | 3/2001 |
| JP | 10-063680 | 8/1996 |
| JP | 2000-222418 | 1/1999 |
| JP | 2002-123555 | 10/2000 |
| WO | WO 02/05084 A2 | 7/2001 |
| WO | WO 02/33571 A2 | 10/2001 |
| WO | WO 02/33572 A2 | 10/2001 |
| WO | WO 02/054326 A2 | 1/2002 |

OTHER PUBLICATIONS

European Search Report dated Aug. 4, 2004.
European Search Report dated Jun. 8, 2005.
Mulani et al., "A Graphical Navigator for Viewing Databases", Software—Practice and Experience, vol. 26(4), Apr. 1996, pp. 411-426.
Zisman et al., "Supporting Interoperability of Autonomous Hospital Databases: A Case Study", Advances in Databases and Information Systems, (1997), pp. 1-17.
Zisman et al., "An Approach to Interoperation Betweem Autonomous Database Systems", The British Computer Society, (1999), pp. 135-148.
European Search Report dated Jun. 30, 2005.

* cited by examiner

*Primary Examiner*—Don Wong
*Assistant Examiner*—Hung Tran Vy
(74) *Attorney, Agent, or Firm*—Reed Smith LLP; Stanley P. Fisher, Esq.; Juan Carlos A. Marquez, Esq.

(57) ABSTRACT

A plurality of database search path candidates are automatically determined and provided. Databases containing information with similar characteristics are divided into groups (hereafter referred to as a "category group"), and a correlation diagram is created based on links between those category groups. In the diagram, high priority is given to links between category groups constituting a path that has to be passed through due to relevance between the characteristic of databases, and normal priority is given to other links. When a path search is carried out in this diagram, an important path is selected regardless of attributes such as distance between databases or time by carrying out a first path search along the high priority path between category groups.

6 Claims, 10 Drawing Sheets

| 201 | 202 | 203 |
|---|---|---|
| A0001 | WITH THE FUNCTION OF RECEIVING A SEARCH KEY AND EXTRACTING RECORDS THAT INCLUDE THE SEARCH KEY... | B0001 |
| | | B0002 |
| | | B0003 |
| A0002 | DESIGNATED ON THE SCREEN BETWEEN THE FIRST DATABASE AND THE TERMINAL DATABASE... | B0004 |
| | | B0005 |
| | | B0006 |
| | | |

METHOD OF DETERMINING DATABASE SEARCH PATH

BACKGROUND OF THE INVENTION

1. Technical Field

The present invention relates to a database search system, and more particularly to a method of determining a database search path for carrying out the extraction of records and search keys between a plurality of databases in a chain-reactive manner.

2. Background Art

There are cases where various records regarding a particular theme are stored in a plurality of different databases. In a typical example, a plurality of databases in which attributes regarding a particular gene or protein are stored as records from different viewpoints are operated by separate organizations. Users of these databases can utilize such a group of databases mainly in the following two ways:
(1) To input a search key concerning a single theme into a plurality of databases in a parallel manner and then extract records with related data; or
(2) To input a search key concerning a single theme into one specific database, and refer to resultant, extracted records. The records in many cases describe information linking them to related records in the form of search keys that can be entered into other databases. Thus, a user can acquire the search keys and enter them into the databases to which they can be entered, so that the user can refer to an extracted record. When there are a plurality of databases, the form of the search keys that can be entered into the databases, namely record IDs or document nos., are often different. Accordingly, in mode of use (1), the user must obtain different kinds of search keys corresponding to a desired theme in advance, thereby complicating the operation. Thus, it is sometimes more advantageous to employ mode of use (2), wherein the input of a single search key corresponding to a desired theme enables the extraction of related records present in other databases in a chain-reactive manner.

Further, a method is used whereby the process of extracting a search key and entering the extracted data into another database is carried out for three or more databases in a chain-reactive manner, instead of two databases on a one-to-one basis, the process being repeated until reaching a terminal database designated in advance by the user. In accordance with this method, the keys, which are information linked to related records, are followed in a chain-reactive manner, so that a search key that cannot be directly entered into a desired terminal database can be indirectly entered thereinto. Therefore, records in the terminal database can be extracted and referred to, thereby improving the efficiency of search-key obtaining operation.

(Non-patent Document 1)

Gene Index Information providing service DNASIS GeneIndex, Version 1.0

SUMMARY OF THE INVENTION

However, in order to carry out the method of mode of use (2) whereby possible candidates are selected and record extraction on all of such candidates are carried out, it is necessary to investigate all the databases regarding the presence or absence of keys that are described in record information constituting databases and that indicate the correlation to records in other databases, and to create a correlation network describing links between databases.

As a typical example where a plurality of various records regarding a specific theme are stored in a plurality of different databases, groups of databases in the field of bioinformatics can be cited. Many of the databases in this field retain links from one database to a plurality of other databases. As the number of databases supported by the system increases, the number of links between databases in a correlation network retained by the system increases. When a path search is carried out on this correlation network, a huge number of path candidates will be derived and the amount of processing will become very large.

In some of the generally known algorithms for performing a path search in such a correlation network, a time value or a cost value is attached to links between individual nodes. Using these values, the algorithms perform a least-time path search or a least-cost path search. However, in the case of the aforementioned links between databases regarding a particular theme, there are many cases where it is impossible to attach a time value or a cost value to the links between themes. In addition, when a user wishes to select a specific path from a large number of path candidates, he might try to obtain a shortest path in terms of the number of links (that is, the distance) that the path can pass through from a key database to a terminal database. However, there are many cases where a path necessary to be passed through due to characteristic correlations between databases is longer than a less important search path (due to a lowered reliability of data because of the presence of secondary databases in the path, or due to an extremely small number of record links between databases on the path, for example). In such case, a path leading to a result different from that expected by a user could be selected because the priority is given to the shortest distance.

Additionally, it is impossible to finally narrow down paths by deriving all useful path candidates and making or clearing selections of intervening databases on the path based on user decisions because only a single path is always derived according to path selection based on the shortest distance or the shortest time.

The present invention has an object to provide a technique wherein all useful path candidates can be derived and highly reliable related data can be extracted.

Thus, databases managing information with similar characteristics are divided into groups (hereafter referred to as a "category group"). A correlation diagram is then created based on links between such category groups. In the diagram, high priority is given to a link between category groups constituting a path that has to be passed through due to relevance between characteristics of data in the databases. Normal priority is given to other lines.

When a path search is performed on such a correlation diagram, a path search between category groups is preferentially performed on paths between category groups with high priority, and then a path search is performed between databases passing through category group path candidates derived by the above path search. It is thereby possible to extract different and important paths as search path candidates specified by a combination of arbitrarily designated key and terminal databases, regardless of attributes such as distance between databases or time.

The above means enable the following effects to be obtained.
(1) In the course of extracting search keys and records in a chain-reactive manner until a terminal database is reached along a particular path using a search key entered by a user, an essentially proper search path is automatically selected as a candidate from a large number of search paths and presented to the user, thereby reducing the labor necessary for specifying a search path.

(2) It is possible to extract highly reliable related data by deriving a link between databases that exists along a link between category groups that is given a priority.

In other words, unnecessary paths given as candidates by the shortest distance search or the shortest time search are removed, so that an important candidate path can be derived.

DETAILED DESCRIPTION OF THE PREFERRED EMBODIMENTS

Figures 1, 2:
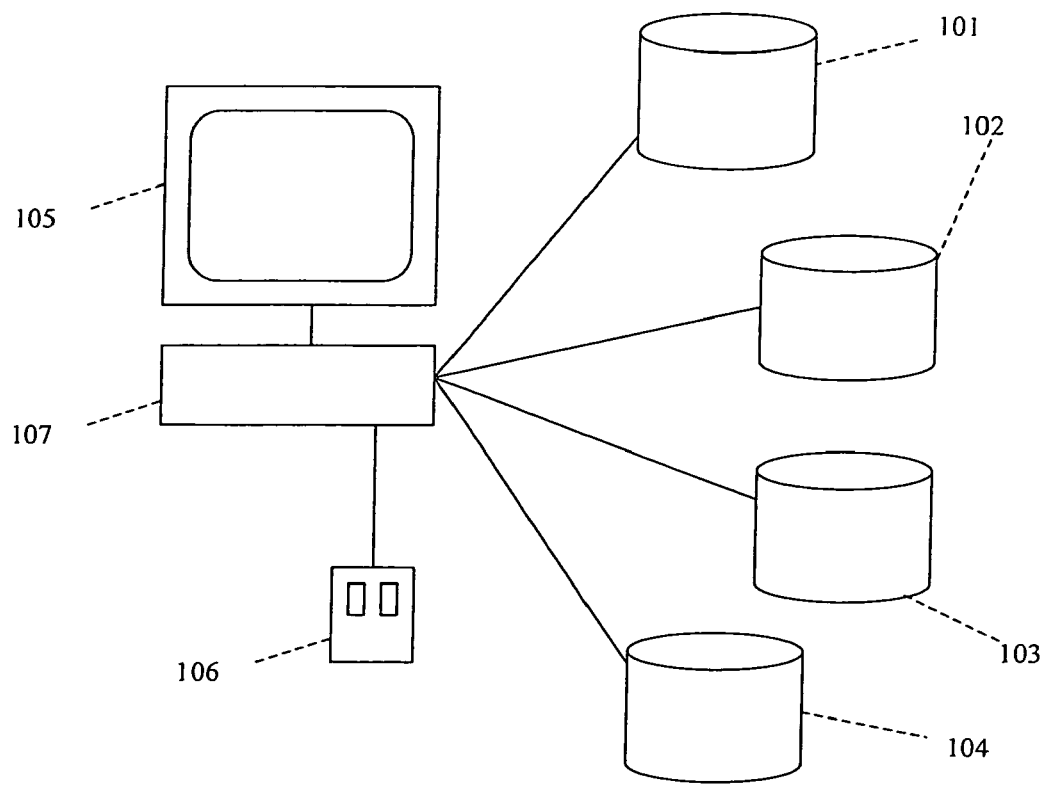
FIG. 1 shows an example of the configuration of a system for automatically determining a database search path according to an embodiment of the present invention.
FIG. 2 shows an example of the structure of a table in the database shown in FIG. 1.

Hereafter an example of a method for automatically determining a database search path according to an embodiment of the present invention will be described by referring to the drawings. FIG. 1 shows an example of the configuration of a database search path automatic determination system according to the present embodiment. Numerals 101 to 104 designate various databases that are searched. Numeral 105 designates a display unit for displaying search results and the records in a database. Numeral 106 designates a mouse unit for indicating a point on the screen of the display unit 105. Numeral 107 designates a transmit/receive and calculating unit for transmitting a search request to the databases 101 to 104 and receiving results therefrom. The results of the transmit and the receive processes are displayed on the display unit 105 by the instruction of the transmit/receive and calculating unit 107.

FIG. 2 shows an example of the structure of a table stored in each of the databases 101 to 104. A column 201 is a field for storing search keys for the database in which the table is stored. A column 202 is a field for storing individual records stored in the database. A column 203 is a field for storing search keys for records in another database that are related to the record stored in the same line. For example, in FIG. 2, B0001, B0002, and B003 are the search keys for records in another database that are related to the record stored in the line identified by A0001.

Figure 3:
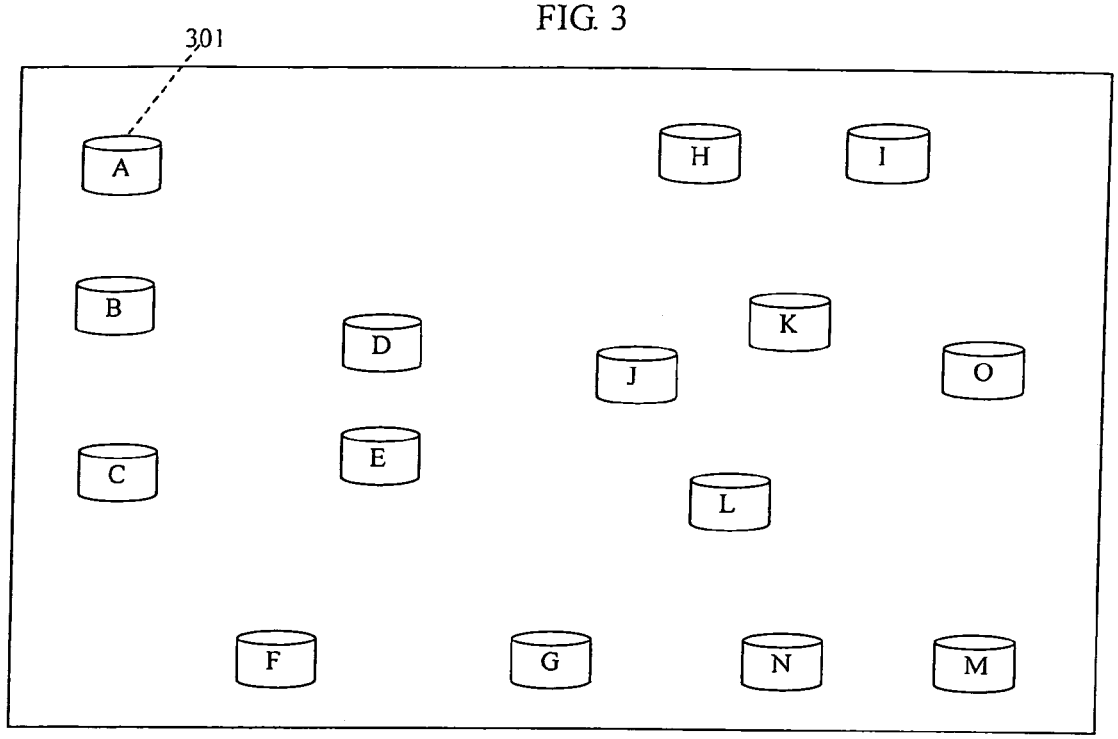
FIG. 3 shows an example of the arrangement of a plurality of databases displayed on the screen.
Figure 4:
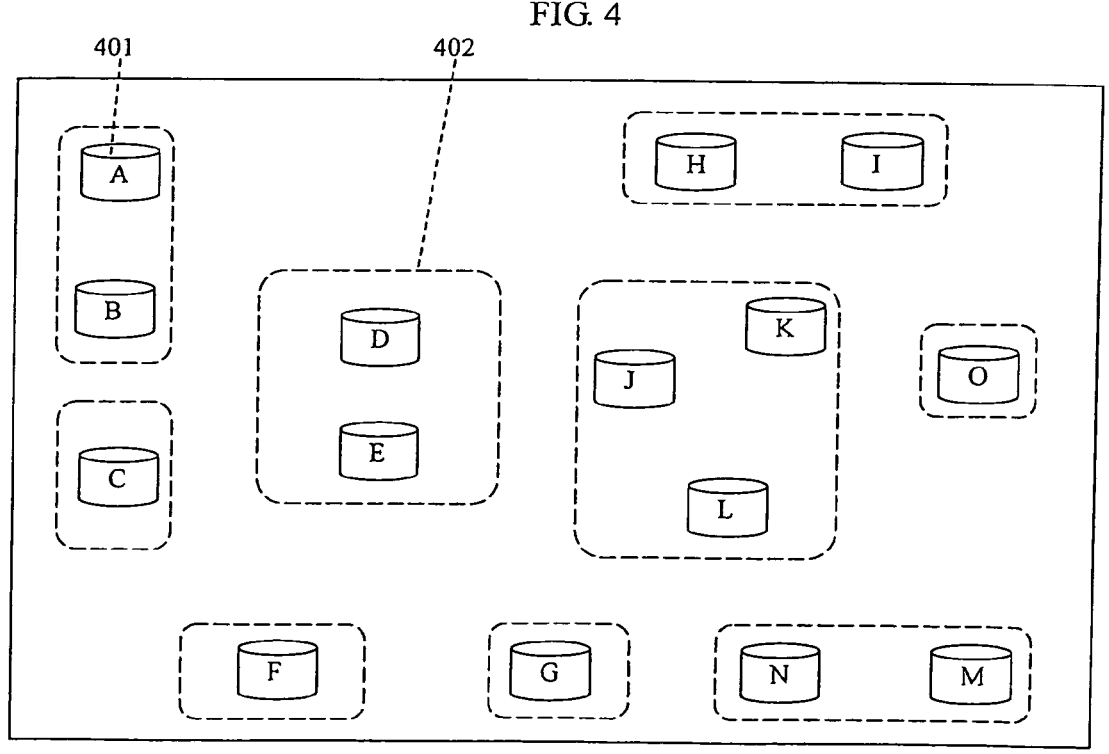
FIG. 4 shows an example of the arrangement of the databases shown in FIG. 3 after they have been divided into groups by category.

FIG. 3 shows the arrangement of databases that are searched by the system according to the embodiment of the present invention. Numeral 301 designates a figure corresponding to each database. As shown in FIG. 3, many databases A to O are displayed on the screen. FIG. 4 shows an example displaying category groups created by classifying databases included in the system of the embodiment into groups of databases managing information of similar characteristics. Numeral 401 designates each database and numeral 402 designates each group created by category-grouping based on, for example, the characteristics of data involved in each database.

Figure 5:
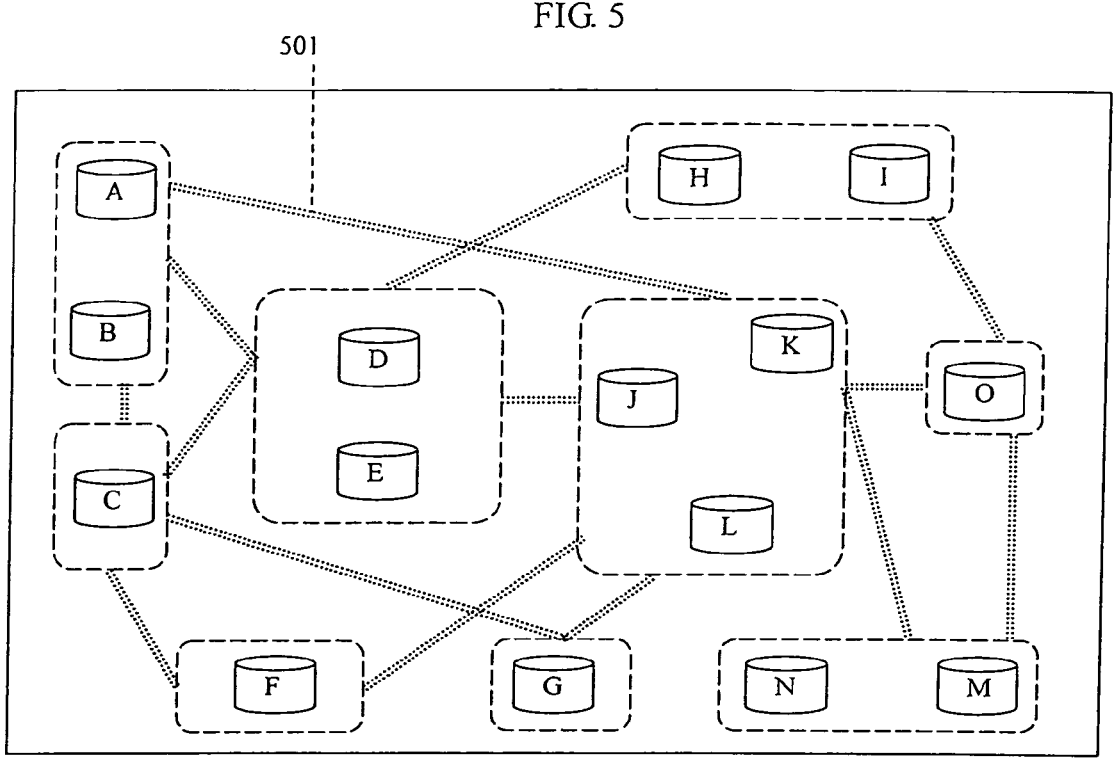
FIG. 5 shows correlations among the category groups shown in FIG. 4 by virtual lines.
Figure 6:
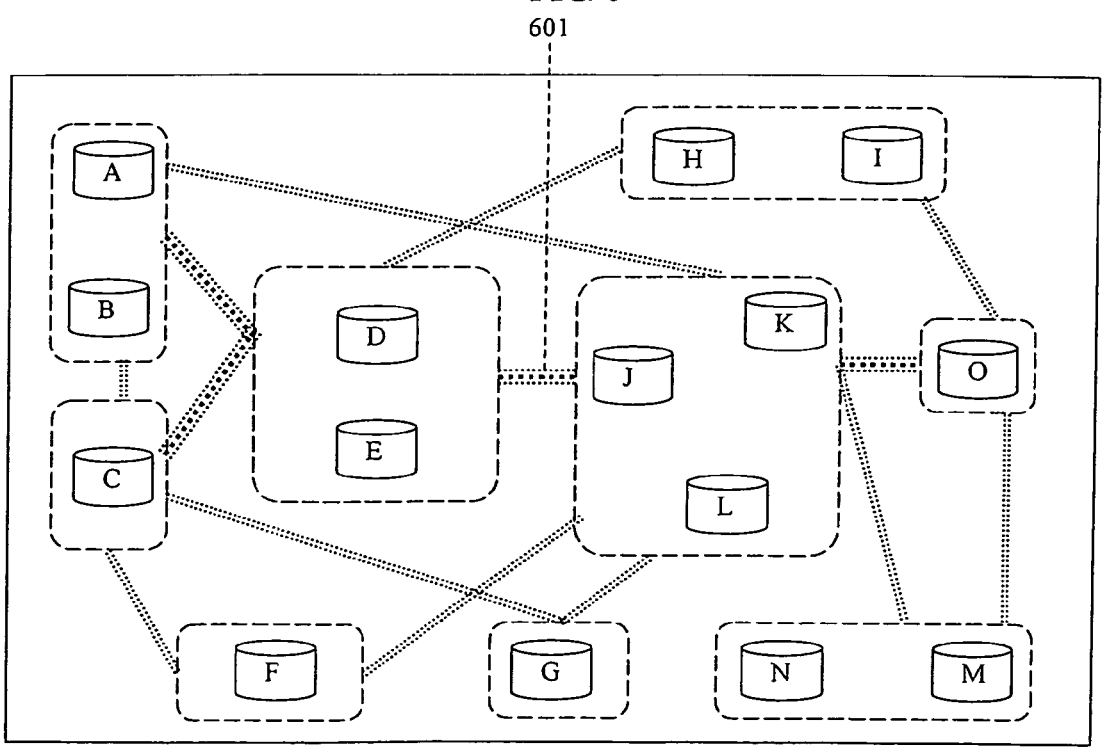
FIG. 6 shows a manner in which weights are assigned to correlations between category groups shown in FIG. 5.
Figure 7:
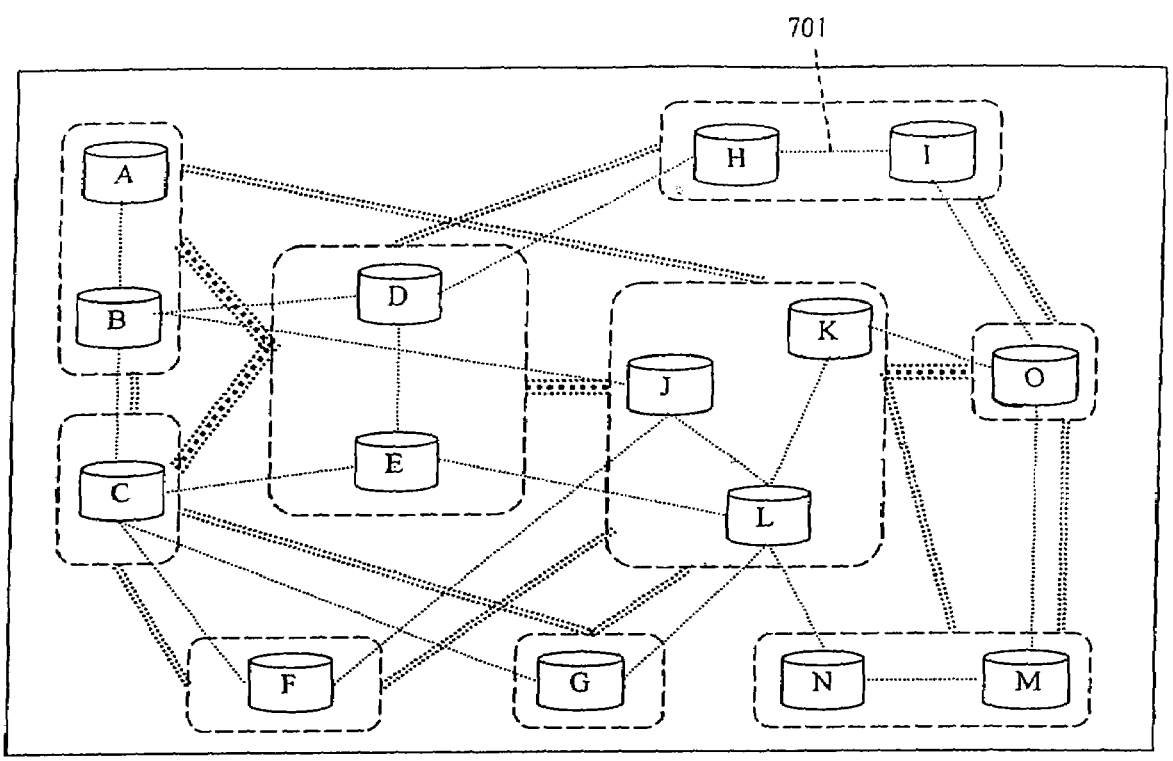
FIG. 7 shows a state wherein lines describing correlations between individual databases are displayed in addition to the correlations between groups.

FIG. 5 shows correlations among the groups by virtual lines 501. FIG. 6 shows a state in which priority is given to correlations based on the conditions of correlations between groups (such as the degree or order of correlation), and virtual line 601 designates a correlation with high priority. FIG. 7 shows a state wherein lines 701 describing the correlations between databases are displayed in addition to the correlations between groups. Among the correlations shown in FIG. 7, only line 701 is displayed in practice.

Figure 8:
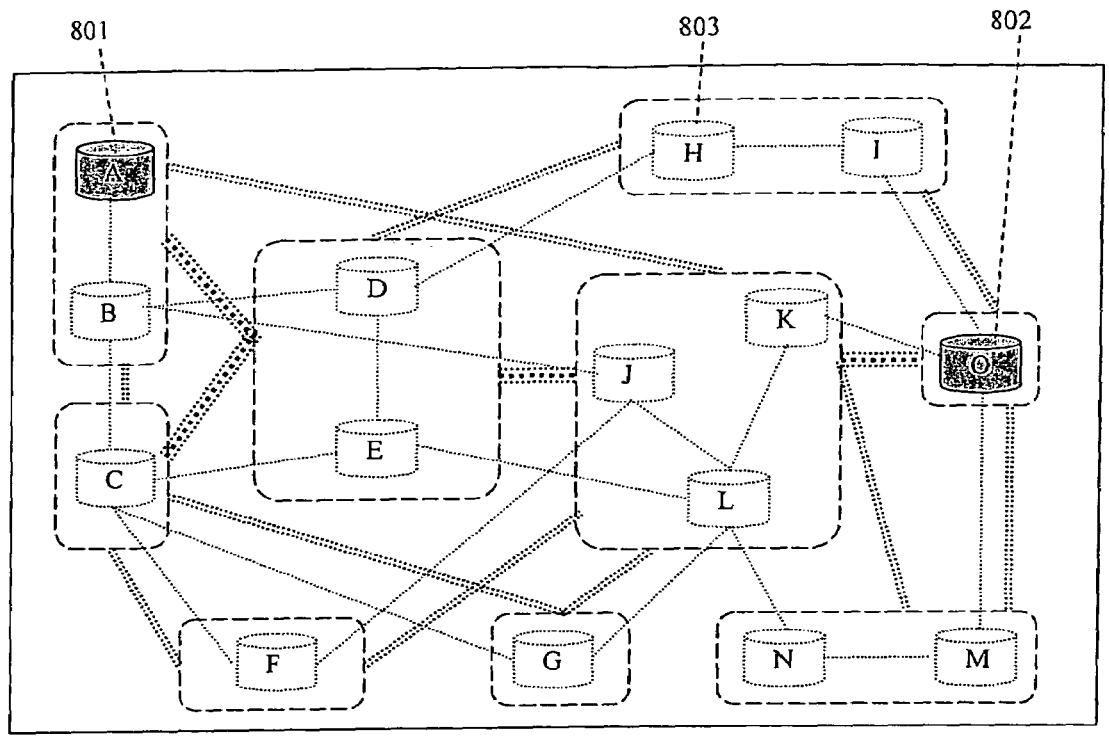
FIG. 8 shows a state wherein a user selects any two databases as a key database and a terminal database in the database correlation diagram.
Figure 9:
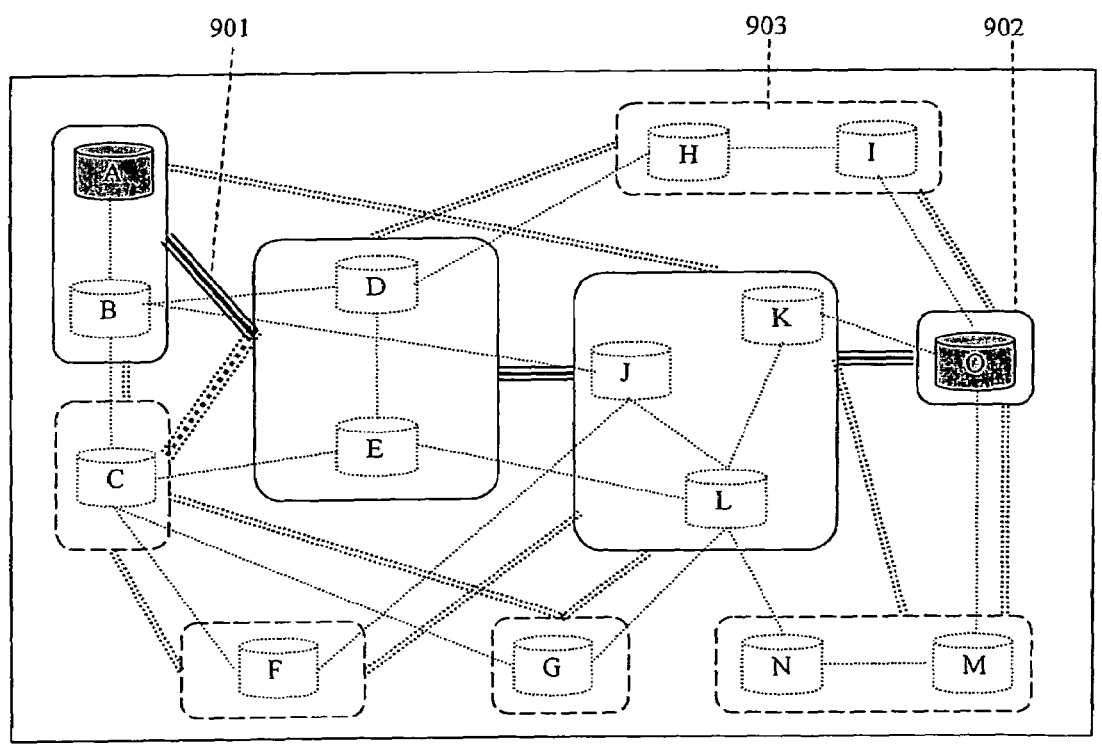
FIG. 9 shows inter-database path candidates that possibly pass through respective groups including the key database and the terminal database.
Figure 10:
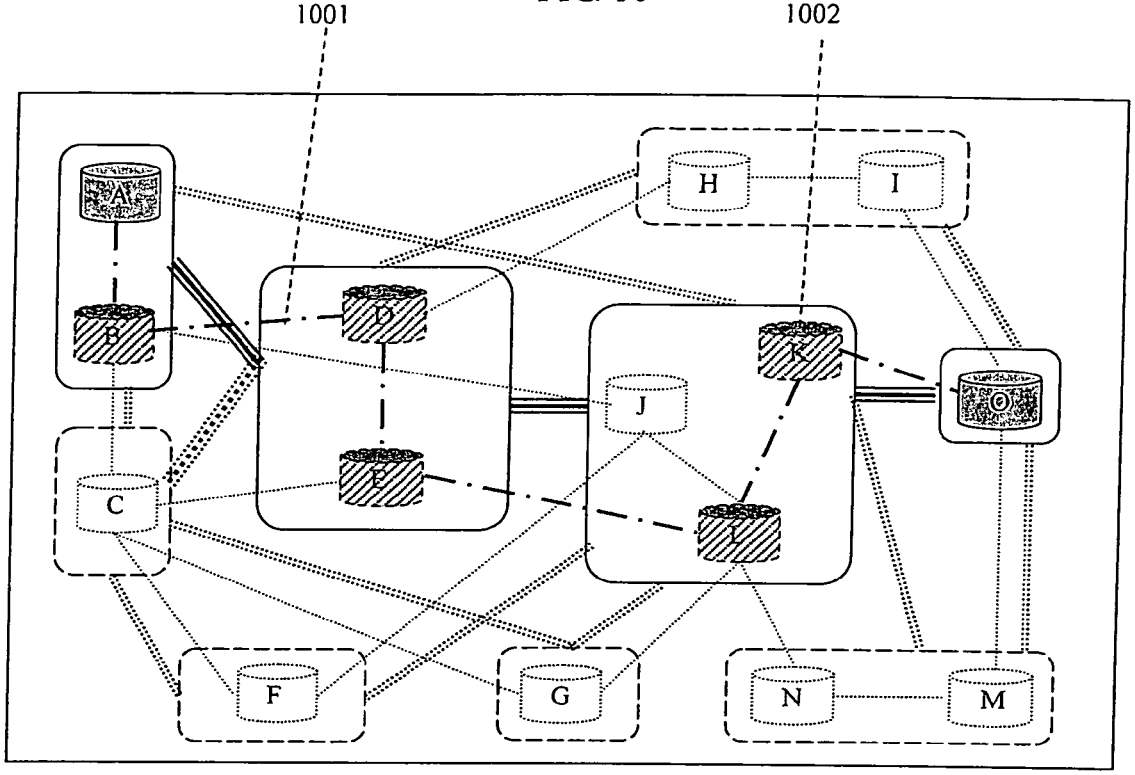
FIG. 10 shows inter-database path candidates derived based on the inter-group path candidates. Possible inter-database path candidates passing through the determined inter-group path candidates are displayed. Individual databases A-B-D-E-L-K-O are databases on a possible inter-database candidate path.

FIG. 8 shows a state wherein a user has selected a key database 801 and a terminal database 802 from the databases in the database correlation diagram, with other databases not selected (databases drawn by dotted line like database H indicated by numeral 803 are not selected). FIG. 9 shows an inter-group path candidate 901 that can run through a group to which the key database 801 belongs and a group to which the terminal database 802 belongs. In the figure, groups surrounded by solid line indicated by numeral 902 are groups present on the path candidate and groups surrounded by dash line that indicated by numeral 903 are groups that are not present on the path candidate, for example. FIG. 10 shows an inter-database path candidate 1001 derived from the inter-group path candidates. The inter-database path candidate 1001 designates a possible inter-database path candidate along the determined inter-group path candidate. Databases drawn by dash line and filled with stripe like database K indicated by numeral 1002 (B-D-E-L-K) are intervening databases present on the possible inter-database path candidate between the key database 801 (A) and terminal database 802 (O).

Figure 11:
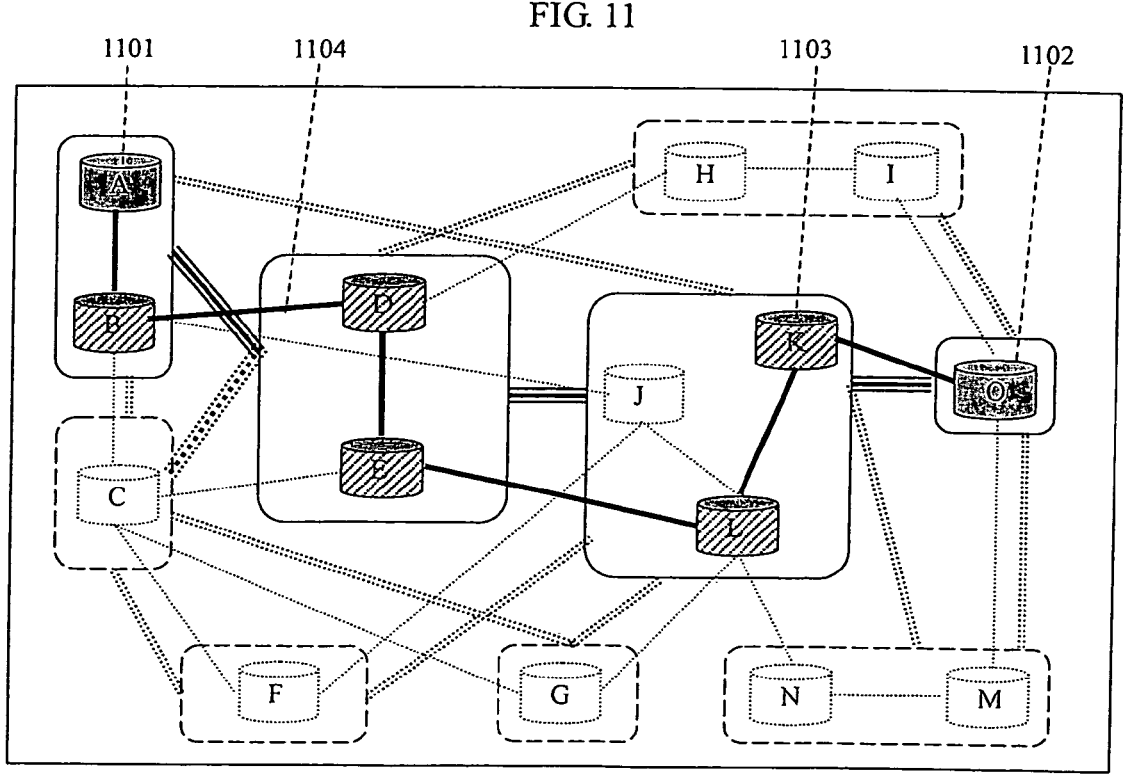
FIG. 11 shows a state wherein a path between databases has finally been determined.

FIG. 11 shows a state wherein an inter-database path 1104 has finally been determined. Numerals 1101 and 1102 designate a key database and a terminal database. Databases drawn by solid line and filled with stripe like database K indicated by numeral 1103 (B-D-E-L-K) are the intervening databases present on the determined path. Thick lines (1104) represent the determined search path.

Figure 12:
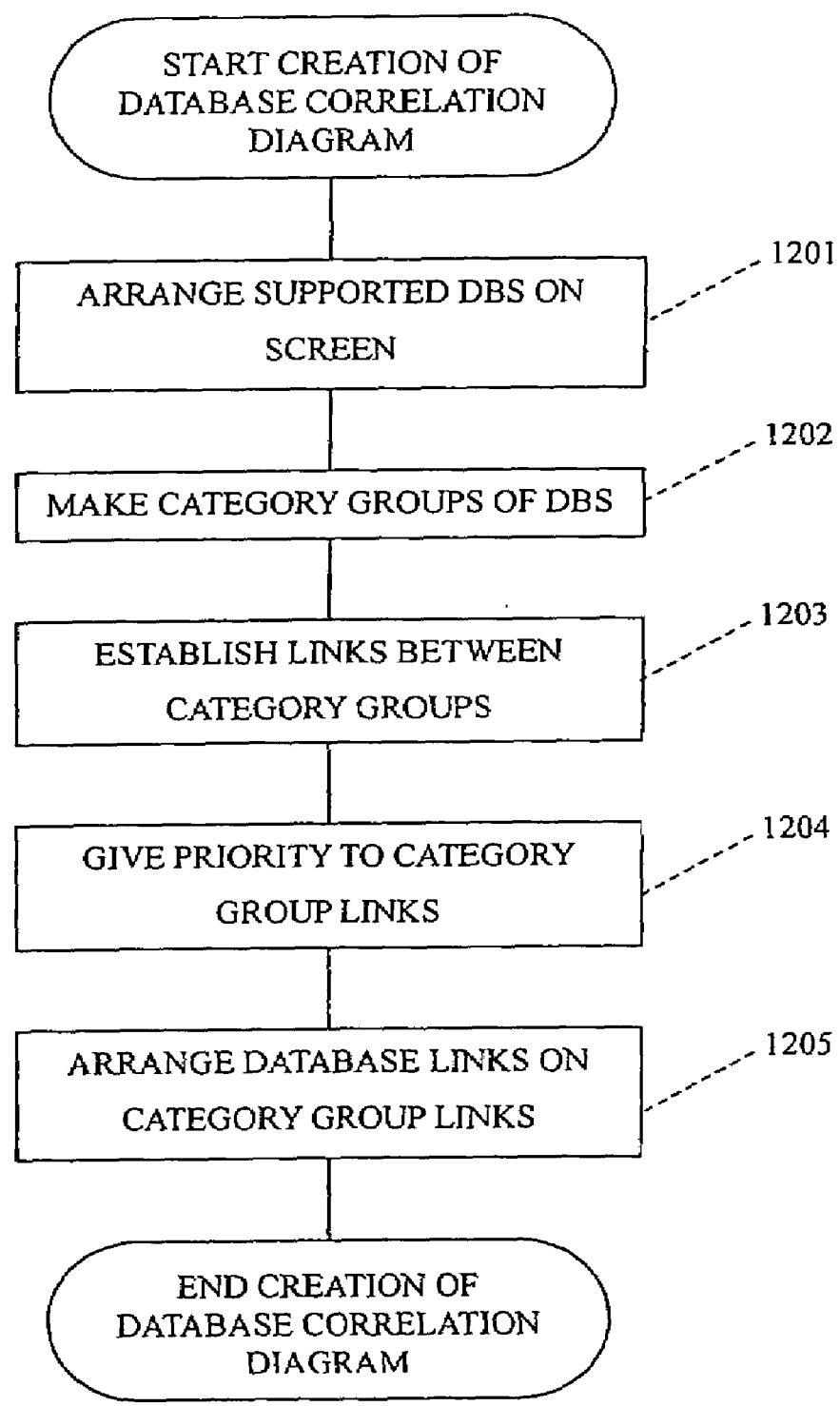
FIG. 12 shows a flowchart illustrating the flow of processes performed by the method for automatically determining a database search path according to the embodiment.
Figure 13:
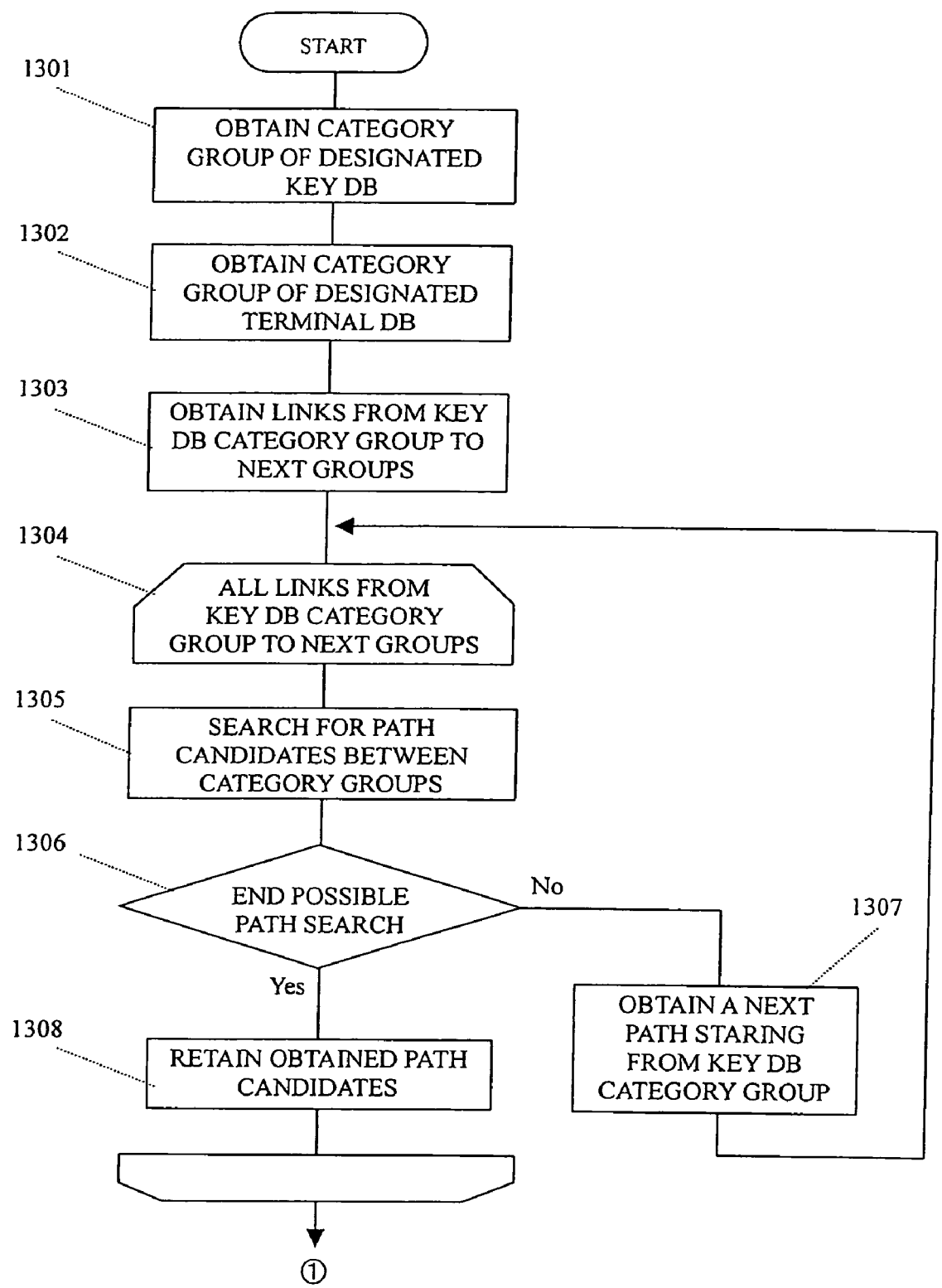
FIG. 13 shows a flowchart, following FIG. 12.
Figure 14:
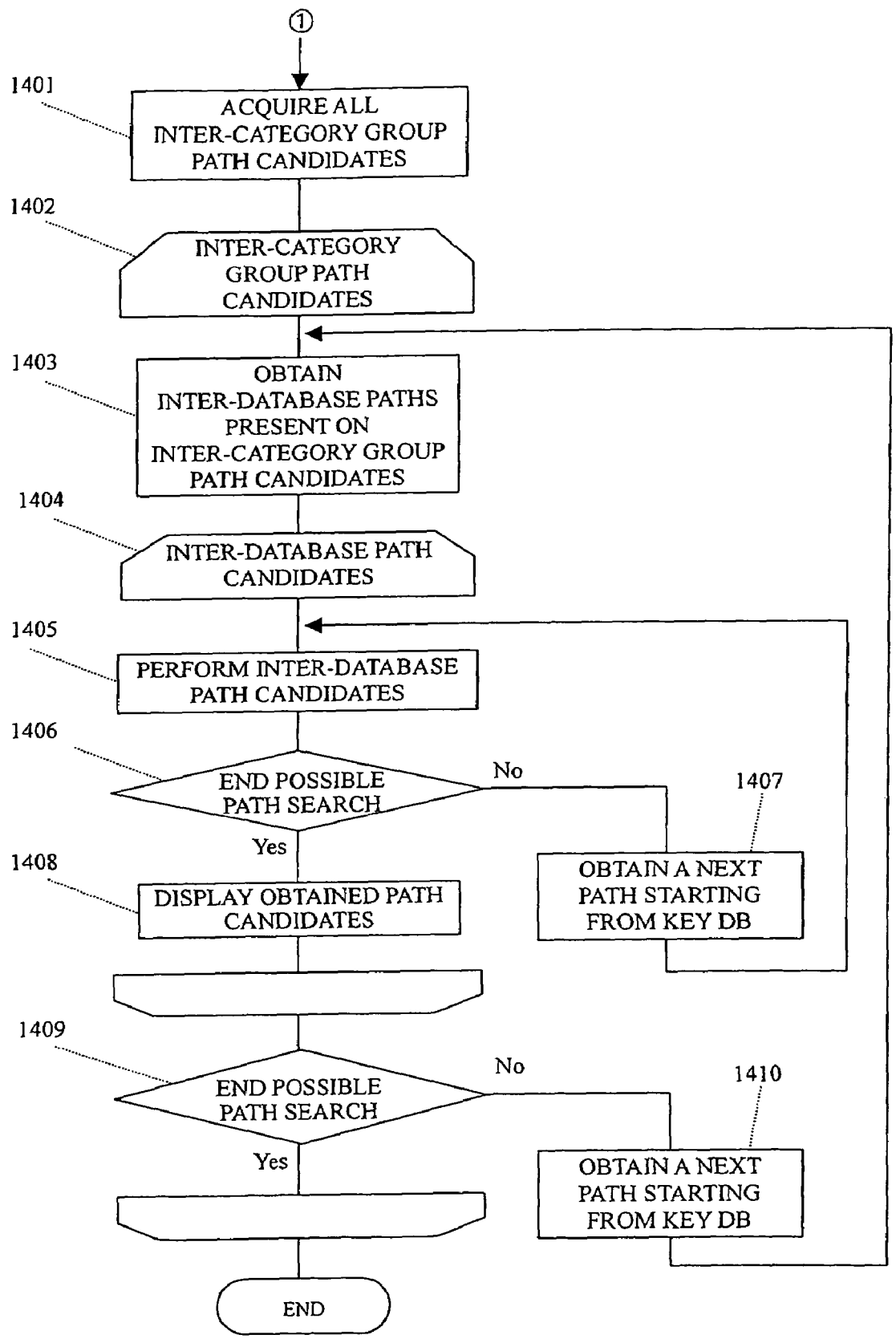
FIG. 14 shows a flowchart, following FIG. 13.
Figure 15:
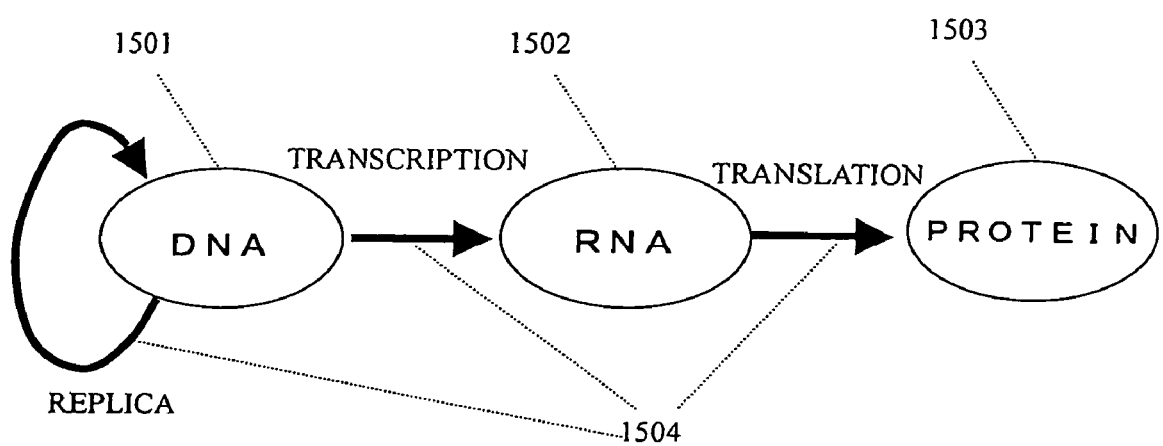
FIG. 15 shows the central dogma of molecular genetics, which is used as an example to give the priority to the correlation between groups in the field of bioinformatics.

FIGS. 12 to 14 show flowcharts illustrating the flow of processes performed by the method for automatically determining a database search path according to the present embodiment. FIG. 15 shows the central dogma of molecular genetics, which is used as an example in giving priority to links between groups in the field of bioinformatics. Numerals 1501 to 1503 represent a nucleic acid of DNA, a nucleic acid of RNA, and a protein, respectively. Numeral 1504 represents the process in which genetic information is transmitted from DNA, RNA to protein.

Hereafter the flow of the processes according to the present embodiment will be described in detail by referring to the flowcharts shown in FIGS. 12 to 14. In the processes of the present embodiment, a database correlation diagram must be provided before search path candidates can be automatically determined. Thus, the flow of processes for creating such a database correlation diagram will be described by referring to FIG. 12. First, in step 1201, databases supported by the system are arranged on the display screen as shown in FIG. 3. Next, in step 1202, a user makes groups of databases managing information with similar characteristics, as shown in FIG. 4 (hereafter such groups are referred to as "category groups").

Then, in step 1203, the user establishes links among category groups as shown in FIG. 5. In step 1204, as indicated by a virtual line 601 of FIG. 6, higher priority (order of priority) is given to those links between category groups that constitute a path that has to be passed through based on characteristic correlation between databases, and normal priority is given to the other links.

The link between category groups in the filed of bioinformatics is taken as an example, as shown in FIG. 15. In this example, priority is given to links between category groups that correspond to the central dogma of molecular genetics (proposed by F. H. C. Crick), which says that genetic information imprinted in molecules of nucleic acid DNA 1501 is transferred to another nucleic acid RNA 1502, and finally transferred to protein 1503. Finally, in step 1205, links between databases are arranged on the links between these category groups.

After the above process, the processes as premises for database search are completed. Reference to the correlation diagram prepared by these processes enables an automatic determination process to be conducted on search path candidates. An example of this process will be described with reference to the flowchart of FIG. 13. First, when databases A 801 and O 802 are designated as a key database and a terminal database, respectively, as shown in FIG. 8, a category group to which the designated key database A 801 belongs as an object to be searched is obtained in step 1301. Then, a category to which the terminal database O 802 designated by the user belongs is obtained in step 1302.

Based on these two category groups, steps from 1303 to 1308 are initially performed to obtain inter-category group path candidates. In step 1303, all the links that can lead from the category group of the key database A to other category groups are obtained. In step 1304, the processes in step 1304 and in subsequent steps are repeated as many times as the number of the links obtained in step 1303. When inter-category group path candidates are searched for in step 1305, attention is paid to the priority given to the paths. As a result, proper path candidates leading from the category group including the key database A to the category group including the terminal database O can be obtained, such as a path 901 shown in FIG. 9.

The processing for finally obtaining inter-database path candidates based on the inter-category group path candidates will be described by referring to FIG. 14. First, in step 1401, the inter-category group path candidates obtained by the flow of FIG. 13 are acquired and the processes in step 1403 and in subsequent steps are performed as many times as the number of the path candidates. In step 1403, inter-database paths present on an acquired inter-category group path candidate are obtained. The processes from steps 1405 to 1408 for obtaining inter-database path candidates are repeated as many times as the number of the inter-database paths in the loop indicated by numeral 1404.

In step 1405, inter-database path candidates present on an inter-category group path candidate obtained in step 1403 are searched for. In step 1406, it is determined whether all possible inter-database paths have been searched for. When the path search is not finished, a path other than paths obtained until the previous search is obtained in step 1407 from inter-database path candidates that can start from the key database. Further, if it is determined that the search for inter-database path candidates is finished in step 1406, the obtained inter-database path candidates are displayed in step 1408.

After all possible inter-database path candidates for one inter-category group path candidate have been obtained, it is determined in step 1409 whether the search for inter-category group path candidates obtained in step 1403 is finished. If the path search is not finished, an inter-category group path other than paths obtained until the previous search is obtained in step 1410 from inter-category group path candidates that can start from the key database A.

If the user attempts to perform the simple shortest distance search on this database correlation diagram, a candidate path "A-B-J-L-K-O" that does not pass through an important path "D–E" would be derived. However, by deriving inter-category group path candidates and then deriving corresponding inter-database paths, a single useful inter-database path candidate "A-B-D-E-L-K-O" can be obtained on the inter-database correlation diagram of FIG. 10.

The user can obtain desired contents by extracting search keys and records in a chain-reactive manner in accordance with this path candidate.

As described above, the method according to the embodiment of the present invention can be used in a database system in which a record extraction is carried out using a first search key that is entered into a key database. A second search key that is contained in the extracted records and different from the first search key is entered into a database different from the key database to carry out a record extraction in the second database. This is followed by the extraction of search keys and records in a plurality of databases in a chain-reactive manner. Upon extraction of records from a pre-designated terminal database, the system provides the extracted records as search results. The invention can provide the following advantages.

(1) When a user wishes to determine a specific path from a number of path candidates, it is possible to know all search path candidates that can run from a key database to a terminal database.

(2) Addition of databases or links between databases can be carried out by incorporating them into the category groups that have been already created, so that it is not necessary to incorporate a new search path determination logic.

(3) When it is necessary to add a new category group to the system for incorporating a new database into the system, the incorporation can be easily carried out since the links among category groups are simpler and smaller in number than those among databases. This enables easy maintenance of the links among the databases to be supported.

The process described with reference to FIGS. 12 to 14 may be rendered into a program to be carried out by a computer, such program being encompassed by the scope of the invention.

According to the present invention, related databases are divided into groups and then inter-group path candidates are searched for. Based on the obtained inter-group path candidates, individual inter-database paths are determined. Thus, when candidates for possible database search paths that can be followed between two databases designated on a network are determined and presented, important search paths can be easily recognized.

What is claimed is:

1. A method of determining a database search path in a database system, which includes databases each containing records with search keys of related records stored in other databases, for extracting records containing a search key that is entered into the system, in which system a starting record extraction is carried out using a starting search key that is entered into a starting database thereby extracting records from the starting database, and an intervening search key that is contained in the extracted records from the starting database and that is different from the starting search key is entered into the intervening database different from the starting database so as to carry out an intervening record extraction in the intervening database in a chain-reactive manner form the starting database via a plurality of intervening databases to the terminal database using search keys and records to link the starting, intervening, and terminal databases, the extracted records as search results, the method comprising:
   a first step of classifying the plurality of databases into groups based on the characteristics of data included in individual databases;
   a second step of creating a correlation network wherein the groups are related with each other based on relevance between the groups;
   a third step of obtaining inter-group path candidates in the correlation network; and
   a fourth step of designating a starting database and a terminal database from the plurality of databases and obtaining an inter-database path candidate that exists on one of the inter-group path candidates that exists between the starting and terminal databases.

2. The method according to claim 1, wherein the third step includes giving priority to the inter-group path candidates and the fourth step includes following a higher priority inter-group path candidate to derive said inter-database path candidate that exists on the higher priority inter-group path candidate.

3. The method according to claim 2, wherein higher priority is given to links between the groups that constitute a path that has to be passed through based on a predetermined characteristic correlation between databases, and normal priority is given to remaining links.

4. A method of determining a database search path in a database system, which includes databases each containing records with search keys of related records stored in other databases, for extracting records containing a search key that is entered into the system, in which system a starting record extraction is carried out using a starting search key that is entered into a starting database thereby extracting records from the starting database, and an intervening search key that is contained in the extracted records from the starting database and that is different from the starting search key is entered into the intervening database different from the starting database so as to carry out an intervening record extraction in the intervening database in a chain-reactive manner form the starting database via a plurality of intervening databases to the terminal database using search keys and records to link the starting, intervening, and terminal databases, the extracted records as search results, the method comprising:
   a first step of classifying the plurality of databases into groups based on the characteristics of data included in individual databases;
   a second step of creating a correlation network wherein the groups are related with each other based on relevance between the groups;
   a third step of designating a starting database and a terminal database from the plurality of databases and obtaining inter-group path candidates that exists between the starting and terminal databases in the correlation network; and
   a fourth step of obtaining an inter-database path candidate that exists on one of the inter-group path candidates.

5. The method according to claim 4, wherein the third step includes giving priority to the inter-group path candidates and the fourth step includes following a higher priority inter-group path candidate to derive said inter-database path candidate that exists on the higher priority inter-group path candidate.

6. The method according to claim 5, wherein higher priority is given to links between the groups that constitute a path that has to be passed through based on a predetermined characteristic correlation between databases, and normal priority is given to remaining links.

* * * * *